US012798224B2

(12) United States Patent
Chow

(10) Patent No.: US 12,798,224 B2
(45) Date of Patent: Nov. 17, 2026

(54) MULTILAYER FILM AND THE USE FOR CONTAINER TYPE HOUSE SYSTEM

(71) Applicant: Kuraray Co., Ltd., Okayama (JP)

(72) Inventor: Edgard Chow, Houston, TX (US)

(73) Assignee: Kuraray Co., Ltd., Okayama (JP)

( * ) Notice: Subject to any disclaimer, the term of this patent is extended or adjusted under 35 U.S.C. 154(b) by 267 days.

(21) Appl. No.: 17/515,915

(22) Filed: Nov. 1, 2021

(65) Prior Publication Data

US 2022/0134724 A1 May 5, 2022

Related U.S. Application Data

(60) Provisional application No. 63/108,531, filed on Nov. 2, 2020.

(51) Int. Cl.

*B32B 27/30* (2006.01)
*A01G 9/14* (2006.01)
*B32B 7/12* (2006.01)
*B32B 27/08* (2006.01)
*B32B 27/32* (2006.01)

(52) U.S. Cl.

CPC .......... *B32B 27/306* (2013.01); *A01G 9/1438* (2013.01); *B32B 7/12* (2013.01); *B32B 27/08* (2013.01); *B32B 27/32* (2013.01); *B32B 2250/03* (2013.01); *B32B 2410/00* (2013.01)

(58) Field of Classification Search

CPC ............ A01G 9/1438; B32B 2307/306; B32B 2307/71; B32B 2307/714; B32B 2410/00; B32B 27/306; B32B 27/32; B32B 27/18; B32B 7/12

See application file for complete search history.

(56) References Cited

U.S. PATENT DOCUMENTS

| | | | | |
|---|---|---|---|---|
| 10,995,189 | B2 * | 5/2021 | Chow | C08J 3/22 |
| 2019/0022911 | A1 * | 1/2019 | Matsuura | B29C 51/14 |
| 2019/0300253 | A1 * | 10/2019 | Muneda | B32B 27/32 |

FOREIGN PATENT DOCUMENTS

| | | | | |
|---|---|---|---|---|
| JP | 2002137342 A * | 5/2002 | | |
| JP | 2006289671 A * | 10/2006 | | |
| JP | 2014172928 A * | 9/2014 | | |
| WO | WO-2008003605 A1 * | 1/2008 | | C07B 43/00 |

OTHER PUBLICATIONS

Machine translation of JP-2014172928-A, retrieved Oct. 4, 2023. (Year: 2014).*
Machine translation of JP-2006289671-A, retrieved Oct. 4, 2023. (Year: 2006).*
Kurary, EVAL E171B, 2016. (Year: 2016).*
Machine translation of JP-2002137342-A, retrieved Jan. 22, 2026. (Year: 2002).*

* cited by examiner

*Primary Examiner* — Callie E Shosho
*Assistant Examiner* — Krupa Shukla
(74) *Attorney, Agent, or Firm* — Morgan, Lewis & Bockius LLP

(57) ABSTRACT

The disclosure relates to a multilayer film having an ethylene-vinyl alcohol copolymer (EVOH) layer, and a container type house system having the same.

20 Claims, No Drawings

MULTILAYER FILM AND THE USE FOR CONTAINER TYPE HOUSE SYSTEM

CROSS REFERENCE TO RELATED APPLICATION

This application claims priority under 35 U.S.C. § 119 from U.S. Provisional Application Ser. No. 63/108,531 (filed 2 Nov. 2020), the disclosure of which is incorporated by reference herein for all purposes as if fully set forth.

FIELD OF THE INVENTION

The present invention relates to a multilayer article and its use for a container type house system such like greenhouses for using in the intensive cultivation under an environment exposed to UV light, fungicide and pesticides. The multilayer article may be comprised of at least a layer of an ethylene-vinyl alcohol copolymer (EVOH) resin composition and a layer of a hydrophobic thermoplastic resin composition, wherein (a) the EVOH resin composition layer is located as an outer layer; and (b) the hydrophobic thermoplastic resin composition layer contains a hindered amine compound having a 2,2,6,6-tetraalkylpiperidine ring structure and having an alkoxy group bonded to a nitrogen atom in the ring structure. The chemical resistance and heat resistance of the multilayer article and the container type house system can be improved.

BACKGROUND OF THE INVENTION

Agricultural structures, such as greenhouses or agricultural tunnels, may be covered with flexible films comprising polymeric materials that are tailored to provide a favorable environment for the cultivation of crops and plants. Polymeric materials such as polyethylene (PE) is used as a general material for greenhouse films. Greenhouse films are periodically exposed to fungicides and pesticides which are used in the intensive cultivation of fruit, vegetables and cut flowers. Sulfur and chlorine containing compounds tend to be especially problematic as they impregnate into the polyethylene and create an acidic environment that deteriorates stabilizers. And, in some cases, the heat resistance of the polyethylene films are not enough, thus the films breaks from metal frames of greenhouses. Thus, service life of greenhouse films sometimes is shorter than target.

EVOH is well known as a crystalline polymer which has the excellent gas barrier and high melting temperature, and is applied in an extensive range of applications. Thus, EVOH can be used as a protective layer from fungicides and pesticides because of its chemical barrier properties. However, EVOH is deteriorated by UV lights, which is disadvantageous as a material for greenhouse films.

On the other hand, a hindered amine compound having a 2,2,6,6-tetraalkylpiperidine ring structure and having an alkoxy group bonded to a nitrogen atom in the ring structure, which is called N-alkoxy hindered amine light stabilizer (NOR-HALS), is known as a new type of HALS with improved resistance to chemicals. It can offer effective protection to plastic products in contact with sulfur, halogens or other acidic substances. However, green house films made with combination of PE and NOR-HALS may not show long service life depending on the environment.

The multilayer articles disclosed herein may establish a long-term use container type house system. It has been found that placing a layer made with combination of EVOH and NOR-HALS as an outer layer of a multilayer article can improve chemical resistance of articles and their service lives significantly. Furthermore, when EVOH is used as an innermost layer of a multilayer article covering a container type house system, the heat resistance of the article was improved so that the article break from metal frames could be avoided.

SUMMARY OF THE INVENTION

In one aspect, the present disclosure relates to a multilayer article comprising a first layer comprising ethylene-vinyl alcohol copolymer (EVOH) and a first hindered amine compound having a 2,2,6,6-tetraalkylpiperidine structure in which an alkoxy group is bonded to a nitrogen atom on the piperidine ring, wherein the first layer is an outer layer; and a second layer comprising a hydrophobic thermoplastic resin and a second hindered amine compound having a 2,2,6,6-tetraalkylpiperidine ring structure and having an alkoxy group bonded to a nitrogen atom in the ring structure. In some embodiments, the multilayer article comprises an adhesive layer between the first and second layers.

In some embodiments, the adhesive layer comprises an acid-functionalized polymer resin composition. The adhesive layer may comprise at least one compound selected from the group consisting of polyethylenes modified with maleic anhydride, polypropylenes modified with maleic anhydride, a maleic anhydride-modified ethylene-ethyl acrylate copolymer, and a maleic anhydride-graft-modified ethylene-vinyl acetate copolymer. The adhesive layer may comprise polyethylene modified with maleic anhydride. The adhesive layer may have a thickness of from about 3 μm to about 50 μm.

In some embodiments, the EVOH has a degree of saponification of about 99 mol % or greater. In additional embodiments, the EVOH has an ethylene content of about 20 mol % or greater and about 55 mol % or less. In further embodiments, a content of the EVOH in the first layer is from 95 mass % to 99.99 mass %.

In some embodiments, the first layer further comprises a phosphoric acid compound. In further embodiments, a content of the hindered amine compound in the first layer is from 0.01 mass % to 5 mass %.

In additional embodiments, the first and second hindered amine compounds are the same. In other embodiments, the first and second hindered amine compounds are different.

In some embodiments, the multilayer article has a total thickness of from about 30 μm to about 1000 μm. In additional embodiments, the first layer has a thickness of from about 3 μm to about 50 μm. In further embodiments, the second layer has a thickness of from about 10 μm to about 500 μm.

In some embodiments, the hydrophobic thermoplastic resin comprises at least one compound selected from the group consisting of polyolefin resins; polyethylenes; polyethylene copolymer resins; polypropylene resins; polybutenes; polypentenes; graft polyolefins obtained by graft modification of these polyolefins with an unsaturated carboxylic acid or an ester thereof; cyclic polyolefin resins; ionomers; an ethylene-vinyl acetate copolymer; an ethylene-acrylic acid copolymer; an ethylene-acrylic acid ester copolymer; a polyester resin; a polyamide resin; polyvinyl chloride; polyvinylidene chloride; acrylic resins; polystyrenes; vinyl ester resins; polyester elastomers; polyurethane elastomers; halogenated polyolefins; and aromatic and aliphatic polyketone. The hydrophobic thermoplastic resin may comprise polyethylene. In additional embodiments, the hindered amine compounds in the first layer and/or second layer comprise TINUVIN NOR 371. In additional embodiments, the hindered amine compounds in the first layer and/or second layer comprise ADEKASTAB LA-81. In additional embodiments, the hindered amine compounds in the first layer and second layer comprise TINUVIN NOR 371. In further embodiments, a content of the hydrophobic thermoplastic resin in the second layer is from 95 mass % to 99.99 mass %. In yet further embodiments, a content of the hindered amine compound in the second layer is from 0.01 mass % to 5 mass %.

In some embodiments, the second layer is an outer layer on the other side of the first layer. In additional embodiments, the first layer is prepared by dry-blending and melt-kneading in an extruder.

In another aspect, the present disclosure relates to a container type house system used under an environment exposed to UV light, fungicide and/or pesticides, wherein the multilayer article according to any one of the preceding claims is used as a house cover article. In some embodiments, the multilayer article is arranged so that the first layer faces inside of the container type house system, and the second layer is located outside of the first layer.

In another embodiment, the present disclosure relates to a house system using in the intensive cultivation under an environment exposed to UV light, fungicide and pesticides, wherein the multilayer article covers a house.

The multilayer article and the container type house system according to the present disclosure have excellent chemical resistance properties and heat resistance properties, and thus may be suitable for long-term use under UV light and fungicides and pesticides.

These and other embodiments, features and advantages of the present invention will be more readily understood by those of ordinary skill in the art from a reading of the following detailed description.

DETAILED DESCRIPTION

In one aspect, the present disclosure relates to a multilayer article and its use for a container type house system, such as greenhouses, for example, for using in the intensive cultivation under an environment exposed to UV light, fungicide and pesticides, the system comprising at least a multi-layered house cover article comprising at least a layer of EVOH resin composition. Further details are provided below.

In the context of the present description, all publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

Except where expressly noted, trademarks are shown in upper case.

Unless stated otherwise, all percentages, parts, ratios, etc., are by weight.

Unless stated otherwise, pressures expressed in psi units are gauge, and pressures expressed in kPa units are absolute. Pressure differences, however, are expressed as absolute (for example, pressure 1 is 25 psi higher than pressure 2).

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the end-points thereof, and all integers and fractions within the range. It is not intended that the scope of the present disclosure be limited to the specific values recited when defining a range.

When the term "about" is used, it is used to mean a certain effect or result can be obtained within a certain tolerance, and the skilled person knows how to obtain the tolerance. When the term "about" is used in describing a value or an end-point of a range, the disclosure should be understood to include the specific value or end-point referred to. In some embodiments, the term "about" refers to a range of values that fall within 10, 9, 8, 7, 6, 5, 4, 3, 2, 1 percent or less of the stated reference value.

As used herein, the terms ""comprises,"" ""comprising,"" ""includes,"" ""including,"" ""has,"" ""having"" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus.

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the multilayer article or a system disclosed herein. A "consisting essentially of" claim occupies a middle ground between closed claims that are written in a "consisting of" format and fully open claims that are drafted in a "comprising" format. Optional additives as defined herein, at a level that is appropriate for such additives, and minor impurities are not excluded from a composition by the term "consisting essentially of".

Further, unless expressly stated to the contrary, "or" and "and/or" refers to an inclusive and not to an exclusive. For example, a condition A or B, or A and/or B, is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the disclosure. This description should be read to include one or at least one and the singular also includes the plural unless it is obvious that it is meant otherwise.

The term "predominant portion" or "predominantly", as used herein, unless otherwise defined herein, means greater than 50% of the referenced material. If not specified, the percent is on a molar basis when reference is made to a molecule (such as hydrogen and ethylene), and otherwise is on a mass or weight basis (such as for additive content).

The term "substantial portion" or "substantially", as used herein, unless otherwise defined, means all or almost all or the vast majority, as would be understood by the person of ordinary skill in the context used. It is intended to take into account some reasonable variance from 100% that would ordinarily occur in industrial-scale or commercial-scale situations.

The term "depleted" or "reduced" is synonymous with reduced from originally present. For example, removing a substantial portion of a material from a stream would produce a material-depleted stream that is substantially depleted of that material. Conversely, the term "enriched" or "increased" is synonymous with greater than originally present.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene and 15 mol % of a comonomer", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

For convenience, many elements of the present invention are discussed separately, lists of options may be provided and numerical values may be in ranges; however, for the purposes of the present disclosure, that should not be considered as a limitation on the scope of the disclosure or support of the present disclosure for any claim of any combination of any such separate components, list items or ranges. Unless stated otherwise, each and every combination possible with the present disclosure should be considered as explicitly disclosed for all purposes.

Although methods and materials similar or equivalent to those described herein can be used in the practice or testing of the present disclosure, suitable methods and materials are described herein. The materials, methods, and examples herein are thus illustrative only and, except as specifically stated, are not intended to be limiting.

EVOH Resin Composition

In one aspect, a resin composition used to produce a layer for the multilayer article of the present disclosure is an EVOH resin composition. In some embodiments, the EVOH resin composition may have 0.01 to 5 part by mass of a hindered amine compound with respect to 100 parts by mass of an EVOH copolymer having an ethylene unit content, for example, of 20 to 55 mol %. Each component will be described below.

Ethylene-Vinyl Alcohol (EVOH) Copolymer

The EVOH of the EVOH resin composition is a copolymer having as a main structural unit an ethylene unit and a vinyl alcohol unit.

The EVOH may have, as a lower limit of ethylene unit content (a proportion of the number of ethylene units to the total number of monomer units in the EVOH (A)), an ethylene unit content of about 20, 21, 22, 23, 24, 25, 26, 27, 28, 29, 30, 31, 32, 33, 34, 35, 36, 37, 38, 39, 40, 41, 42, 43, 44, 45, 46, 47, 48 mol % or greater. In some embodiments, the lower limit may be 26 mol %. In some embodiments, the lower limit may be 30 mol %. On the other hand, the EVOH (A) may have, as an upper limit of ethylene unit content, an ethylene unit content about 60, 59, 58, 57, 56, 55, 54, 53, 52, 51, 50, 49, 48 mol % or less. In some embodiments, the upper limit may be 45 mol %. The EVOH having an ethylene unit content of no less than the lower limit may give an excellent chemical barrier properties in high humidity and gives excellent melt moldability. In addition, the EVOH having an ethylene unit content of no greater than the upper limit may give excellent chemical barrier properties.

The EVOH may have, as a lower limit of degree of saponification (a proportion of the number of vinyl alcohol units to the total number of the vinyl alcohol units and vinyl ester units in the EVOH), a degree of saponification of about 80, 81, 82, 83, 84, 85, 86, 87, 88, 89, 90, 91, 92, 93, 94, 95, 96, 97, 98, 99 mol % or greater. In some embodiments, the lower limit may be 95 mol % or greater. In some embodiments, the lower limit may be 99 mol % or greater. On the other hand, the EVOH may have, as an upper limit of degree of saponification, a degree of saponification of (substantially) 100 mol %, or about 99.99 mol % or less. The EVOH having a degree of saponification of no less than the lower limit gives excellent chemical barrier properties and thermal stability.

A method of preparing the ethylene-vinyl alcohol copolymer is not particularly limited, and may include well-known preparing methods. For example, in a general method, an ethylene-vinyl ester copolymer obtained by copolymerizing ethylene and vinyl ester monomer is saponified under the presence of a saponification catalyst, in an organic solvent including alcohol.

Examples of the vinyl ester monomer may include vinyl formate, vinyl acetate, vinyl propionate, vinyl butyrate, vinyl isobutyrate, vinyl pivalate, vinyl versatate, vinyl caproate, vinyl caprylate, vinyl laurate, vinyl palmitate, vinyl stearate, vinyl oleate, and vinyl benzoate. Particularly, vinyl acetate is preferable.

A method of copolymerizing ethylene and vinyl ester monomer may include well-known methods such as solution polymerization, bulk polymerization, suspension polymerization, and emulsion polymerization. As a polymerization initiator, an azo-based initiator, peroxide-based initiator, redox-based initiator, and the like may be properly selected according to a polymerization method. The copolymerization may be performed under presence of thiol compounds such as thioacetic acid and mercaptopropionic acid, or other chain-transfer agents.

For the saponification reaction, alcoholysis, hydrolysis, and the like, which uses a well-known alkali catalyst or acidic catalyst as a saponification catalyst in an organic solvent, may be used. In particular, a saponification reaction using a caustic soda catalyst with methanol as a solvent is simple and easy.

The EVOH used in the EVOH resin composition may be a combination of two or more different types of EVOH. For example, the EVOH can be composed of a mixture of two or more types of EVOH that are different in ethylene unit content, with the combination having an ethylene content that is calculated as an average value from a mixed mass ratio. In this case, the difference between two types of EVOH that have different ethylene unit contents is typically about 30 mol % or less, or about 20 mol % or less, or about 15 mol % or less.

Similarly, the EVOH can be composed of a mixture of two or more types of EVOH that are different in degree of saponification, with the combination having a degree of saponification that is calculated as an average value from a mixed mass ratio. In this case, the difference in degree of saponification is typically about 7% or less, or about 5% or less.

When the EVOH resin composition is molded into a multilayered structure that is desired, as a multilayered structure, to achieve a balance between thermal moldability and oxygen barrier properties at a high level, the EVOH may be obtained by mixing an EVOH having an ethylene unit content of from about 24 mol % to about 40 mol % and a degree of saponification of about 99% or greater, with an EVOH having an ethylene unit content of from about 40 mol % to about 50 mol % and a degree of saponification of about 99% or greater, in a blending mass ratio of about 60/40 to about 90/10.

The ethylene unit content and the degree of saponification of the EVOH can be determined by nuclear magnetic resonance (NMR) analysis by conventional methods as recognized by one or of ordinary skill in the relevant art.

The EVOH may have, as a lower limit of a melt flow rate (a measured value at a temperature of 190° C. and a load of 2160 g in accordance with JIS K 7210), a melt flow rate of about 0.1 g/10 min or more, or about 0.5 g/10 min or more, or about 1 g/10 min or more, or about 3 g/10 min or more. On the other hand, the EVOH typically has, as an upper limit of a melt flow rate, a melt flow rate of about 200 g/10 min or less, or about 50 g/10 min or less, or about 30 g/10 min or less, or about 15 g/10 min or less, or about 10 g/10 min or less. The EVOH having a melt flow rate value in the above range improves melt kneadability and melt moldability of a resultant resin composition.

A modified EVOH can also be used. For example, a modified EVOH can have at least one structural unit selected from, for example, structural units (I) and (II) shown below.

(I)

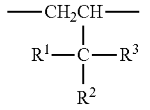

(II)

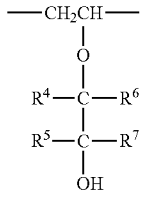

When present, such the structural unit are present at a ratio of from about 0.5 mol % to about 30 mol % based on the total structural units. Such a modified EVOH may improve flexibility and moldability of a resin or a resin composition.

Each of $R^1$, $R^2$ and $R^3$ in the above formula (I) independently represents a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms, or a hydroxy group. Also, one pair of $R^1$, $R^2$ or $R^3$ may be combined together (excluding a pair of $R^1$, $R^2$ or $R^3$ in which both of them are hydrogen atoms). Further, the aliphatic hydrocarbon group having 1 to 10 carbon atoms, the alicyclic hydrocarbon group having 3 to 10 carbon atoms, or the aromatic hydrocarbon group having 6 to 10 carbon atoms may have the hydroxy group, a carboxy group or a halogen atom. On the other hand, each of $R^4$, $R^5$, $R^6$ and $R^7$ in the above formula (II) independently represents the hydrogen atom, the aliphatic hydrocarbon group having 1 to 10 carbon atoms, the alicyclic hydrocarbon group having 3 to 10 carbon atoms, the aromatic hydrocarbon group having 6 to 10 carbon atoms, or the hydroxy group. $R^4$ and $R^5$, or $R^6$ and $R^7$ may be combined together (excluding when both $R^4$ and $R^5$ or both $R^6$ and $R^7$ are hydrogen atoms). Also, the aliphatic hydrocarbon group having 1 to 10 carbon atoms, the alicyclic hydrocarbon group having 3 to 10 carbon atoms, or the aromatic hydrocarbon group having 6 to 10 carbon atoms may have the hydroxy group, an alkoxy group, the carboxy group or the halogen atom.

In another example, the following modified EVOH can be used as the EVOH, wherein the modified EVOH copolymer is represented by a following formula (III), contents (mol %) of a, b, and c based on the total monomer units that satisfy following formulae (1) through (3), and a degree of saponification (DS) defined by a following formula (4) is not less than about 90 mol %.

(III)

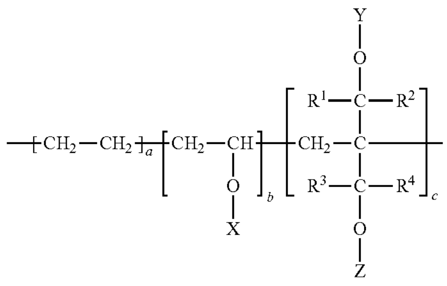

$$18 \leq a \leq 55 \quad (1)$$

$$0.01 \leq c \leq 20 \quad (2)$$

$$[100 - (a + c)] \times 0.9 \leq b \leq [100 - (a + c)] \quad (3)$$

DS=[(Total Number of Moles of Hydrogen Atoms in X, Y, and Z)/(Total Number of Moles of X, Y, and Z)]×100 (4)

In the formula (III), each of $R^1$, $R^2$, $R^3$ and $R^4$ independently denotes a hydrogen atom or an alkyl group having a carbon number of from 1 to 10, and the alkyl group may include a hydroxyl group, an alkoxy group, or a halogen atom. Each of X, Y, and Z independently denotes a hydrogen atom, a formyl group, or an alkanoyl group having a carbon number of from 2 to 10.

The EVOH may also contain, as a copolymer unit, a small amount of another monomer unit other than the ethylene unit and the vinyl alcohol unit within a range not to inhibit the purpose of the present invention. Examples of such a monomer include α-olefins such as propylene, 1-butene, isobutene, 4-methyl-1-pentene, 1-hexene, and 1-octene; unsaturated carboxylic acids such as itaconic acid, methacrylic acid, acrylic acid, and maleic acid, salts thereof, partial or complete esters thereof, nitriles thereof, amides thereof, and anhydrides thereof; vinylsilane compounds such as vinyltrimethoxysilane, vinyltriethoxysilane, vinyltri (2-methoxyethoxy)silane, and γ-methacryloxypropyltrimethoxysilane; unsaturated sulfonic acids or salts thereof; unsaturated thiols; and vinylpyrrolidones.

Hindered Amine Compound Having a 2,2,6,6-Tetraalkylpiperidine Ring Structure and Having an Alkoxy Group Bonded to a Nitrogen Atom in the Ring Structure The hindered amine compound having a 2,2,6,6-tetraalkylpiperidine ring structure and having an alkoxy group bonded to a nitrogen atom in the ring structure used in the present disclosure is so called NOR-HALS, which is a piperidine derivative, and more preferably a 2,2,6,6-tetraalkylpiperidine derivative. Such piperidine derivatives include those in which a hydrogen atom, an alkyl group, an alkyl group having an ester bond, an alkoxy group and the like are bonded to a nitrogen atom on the piperidine ring, and those having an alkoxy group bonded are preferable because of the excellent effect of improving weather resistance. In some embodiments, the hindered amine compound disclosed herein includes a compound represented by formula (I) below:

(I)

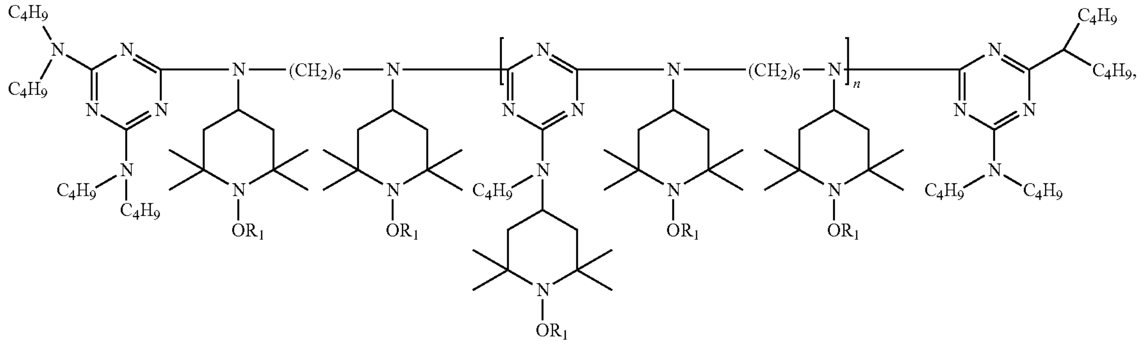

in which $R_1$ is $C_1$-$C_5$ alkyl, and n is a number from 1 to 10. In additional embodiments, $R_1$ is propyl. Examples of hindered amine compounds having a 2,2,6,6-tetraalkylpiperidine structure in which an alkoxy group is bonded to a nitrogen atom on the piperidine ring include TINUVIN NOR 371 (trade name), Adekastab LA-81 (trade name), etc. In particular, TINUVIN NOR 371 is preferred. These hindered amine compounds may be used alone or in combination of two or more.

In some embodiments, the content of the hindered amine compound used in an EVOH layer disclosed herein is preferably 0.01 to 5 part by mass, more preferably 0.02 to 1 part by mass, based on 100 parts by mass of EVOH layer. In some embodiments, a content of the hindered amine compound disclosed herein is from about 1, 0.9, 0.8, 0.7, 0.6, 0.5, 0.4, 0.3, 0.2, or 0.1 mass % to about 5, 4, 3, 2, 1, 0.9, 0.8, 0.7, 0.6, 0.5, 0.4 or 0.3 mass % of the EVOH layer. When the content of the hindered amine compound is less than 0.01 parts by mass, the hindered amine compound may not have any impact on the EVOH layer. On the other hand, when the content of the hindered amine-based compound is more than 5 part by mass, the film may be colored.

There are no particular limitations on the method of incorporating the hindered amine compound into the resin composition of the present invention. For example, a method of immersing EVOH in a solution in which the above compound is dissolved, a method of melting EVOH and mixing the above compound, a method of melt blending EVOH and a hindered amine compound in an extruder, and the like can be mentioned. Among them, a method in which EVOH and a hindered amine compound are dry-blended and further melt-kneaded in an extruder is preferable.

Optional Components

The EVOH resin composition may contain other optional components within a range not to impair the effects of the present invention. Examples of such other components include, for example, a boron compound, an alkali metal salt, a phosphoric acid compound, an oxidizable substance, another polymer, an oxidization accelerator, and another additive.

Addition of a boron compound to the EVOH resin composition may be advantageous in terms of improving melt viscosity of the EVOH and obtaining a homogenous coextrusion molded product. Examples of suitable boron compounds include boric acids, a boric acid ester, a boric acid salt, and boron hydrides. Specific examples of the boric acids include orthoboric acid (hereinafter, also merely referred to as "boric acid"), metaboric acid and tetraboric acid. Specific examples of the boric acid ester include triethyl borate and trimethyl borate. Specific examples of the boric acid salt include alkali metal salts and alkaline earth metal salts of the above various types of boric acids, and borax. Among these compounds, orthoboric acid is preferred.

When a boron compound is added, the content of the boron compound in the composition is typically from about 20 ppm, or from about 50 ppm, to about 2000 ppm, or to about 1500 ppm, in terms of the boron element equivalent. The content of the boron compound in this range can give EVOH that is produced while torque variation is suppressed during heat melting.

The EVOH resin composition may also contain an alkali metal salt in an amount of from about 5 ppm, or from about 20 ppm, or from about 30 ppm, to about 5000 ppm, or to about 1000 ppm, or to about 500 ppm, in terms of the alkali metal element equivalent. The resin composition containing an alkali metal salt in the above range can improve the interlayer adhesiveness and the compatibility. An alkali metal is exemplified by, for example, lithium, sodium, and potassium, and the alkali metal salt is exemplified by, for example, an aliphatic carboxylic acid salt, an aromatic carboxylic acid salt, a phosphoric acid salt, and a metal complex of the alkali metal. Examples of the alkali metal salt include sodium acetate, potassium acetate, sodium phosphate, lithium phosphate, sodium stearate, potassium stearate, and sodium salts of ethylene diamine tetraacetic acid. Especially, sodium acetate, potassium acetate, and sodium phosphate are preferred.

The EVOH resin composition may also contain a phosphoric acid compound in an amount of from about 1 ppm, or from about 5 ppm, or from about 10 ppm, to about 500 ppm, or to about 300 ppm, or to about 200 ppm, in terms of the phosphate radical equivalent. Blending the phosphoric acid compound in the above range can improve the thermal stability of the EVOH and suppress, in particular, generation of gel-state granules and coloring during melt molding for a long period of time.

The type of the phosphoric acid compound added to the EVOH resin composition is not particularly limited, and there can be used, for example, various types of acids such as phosphoric acid and phosphorous acid, and salts thereof. The phosphoric acid salt may be any form of a primary phosphoric acid salt, a secondary phosphoric acid salt, and a tertiary phosphoric acid salt. Although the cation species of the phosphoric acid salt is not also particularly limited, an alkali metal or an alkaline earth metal is preferred as the cation species. Especially, the phosphorus compound is preferably added in the form of sodium dihydrogen phosphate, potassium dihydrogen phosphate, disodium hydrogen phosphate or dipotassium hydrogen phosphate.

The EVOH resin composition may also contain various types of other additives within a range not to impair the effects of the present invention. Examples of such other additives include an antioxidant, a plasticizer, a heat stabilizer (melt stabilizer), a photoinitiator, a deodorizer, an ultraviolet ray absorber, an antistatic agent, a lubricant, a colorant, a filler, a drying agent, a bulking agent, a pigment, a dye, a processing aid, a fire retardant, and an anti-fogging agent. Further, the above hindered amine compound may be contained after the additive is contained in EVOH, or the additive and the above hindered amine compound may be simultaneously contained to obtain a resin composition.

Mass Ratio of EVOH and Hindered Amine Compound

In the EVOH resin composition according to some embodiments of the present disclosure, a mass ratio of an amount of EVOH to a total amount of the EVOH and the hindered amine compound is from about 90, 91, 92, 93, 94, 95, 96, 97, 98, 99, 99.1, 99.2, 99.3, 99.4, 99.5, 99.6, 99.7, 99.8, or 99.9 to about 99.99, 99.9, 99.8, 99.7, 99.6, 99.5, 99.4, 99.3, 99.2, 99.1, 99.0 mass %. In some embodiments, a content of the hindered amine compound disclosed herein is from about 1, 0.9, 0.8, 0.7, 0.6, 0.5, 0.4, 0.3, 0.2, or 0.1 mass % to about 5, 4, 3, 2, 1, 0.9, 0.8, 0.7, 0.6, 0.5, 0.4 or 0.3 mass % of the total amount of the EVOH and the hindered amine compounds.

Multilayer Article

A multilayer article having the EVOH resin composition layer as the innermost layer shows excellent chemical resistance properties, heat resistance properties. The multilayer article is useful for a long-term use container type house system.

Structure of Multilayer Article

The multilayer article of the present invention has an innermost layer of the EVOH resin composition (E). The multilayer article may contain one or more other types of layers, for example, hydrophobic thermoplastic resin composition layers (T) and adhesive layers (AD). The following layer structures are exemplarily mentioned.

Adhesive Layer

As indicated above, the multilayer article in accordance with the present invention may contain at least one adhesive layer based. Suitable adhesive layers are generally known to those of ordinary skill in the art based on the two layers being adhered.

In one embodiment, the adhesive layer(s) is an acid-functionalized polymer resin composition. For adhesion between the layer of the EVOH resin composition (EVOH resin composition layer or EVOH layer) and the layer of the hydrophobic thermoplastic resin composition (hydrophobic thermoplastic resin layer), an adhesive resin layer is typically interposed between these layers. Typical examples of the adhesive resin include carboxyl group-containing modified polyolefin resins obtained by chemically binding an unsaturated carboxylic acid or an anhydride thereof to a polyolefin resin. Specific examples of the adhesive resin include polyethylenes modified with maleic anhydride, polypropylenes modified with maleic anhydride, a maleic anhydride-modified ethylene-ethyl acrylate copolymer, and a maleic anhydride-graft-modified ethylene-vinyl acetate copolymer. In terms of mechanical strength and molding processability, polyethylenes modified with maleic anhydride and polypropylenes modified with maleic anhydride are preferable, and polyethylenes modified with maleic anhydride are particularly preferable among these.

Regarding the melt viscosity of the adhesive resin, the MFR at 190° C. and a 2160-g load typically has a lower limit of about 0.1 g/10 minutes, or about 0.2 g/10 minutes, and typically has an upper limit of about 100 g/10 minutes, or about 60 g/10 minutes. The difference between the MFR of the adhesive resin and the MFR of the EVOH resin composition is preferably small. When the melt viscosity of the adhesive resin is as described above, an excellent multilayer article having excellent adhesive strength without any layer turbulence can be obtained.

Hydrophobic Thermoplastic Resin Layer

Other constituent layers of the multilayer articles of the present invention, which are not the layers of the EVOH resin composition and the adhesive resin composition, are not particularly limited.

In order to avoid moisture, which can reduce the barrier property of the EVOH resin composition, the resin contained in other constituent layer is typically a hydrophobic thermoplastic resin composition comprising, as a predominant portion, one or more hydrophobic thermoplastic resins. Examples of suitable hydrophobic thermoplastic resins include polyolefin resins; polyethylenes such as linear low-density polyethylenes, low-density polyethylenes, ultra-low-density polyethylenes, ultra-low-density linear polyethylenes, medium-density polyethylenes, and high-density polyethylenes; polyethylene copolymer resins such as ethylene-α-olefin copolymers; polypropylene resins such as polypropylenes, ethylene-propylene (block and random) copolymers, and propylene-α-olefin (C4-20 α-olefin) copolymers; polybutenes; polypentenes; graft polyolefins obtained by graft modification of these polyolefins with an unsaturated carboxylic acid or an ester thereof; cyclic polyolefin resins; ionomers; an ethylene-vinyl acetate copolymer; an ethylene-acrylic acid copolymer; an ethylene-acrylic acid ester copolymer; a polyester resin; a polyamide resin; polyvinyl chloride; polyvinylidene chloride; acrylic resins; polystyrenes; vinyl ester resins; polyester elastomers; polyurethane elastomers; halogenated polyolefins such as chlorinated polyethylenes and chlorinated polypropylenes; and aromatic and aliphatic polyketones. In terms of mechanical strength and molding processability, polyolefin resins are preferable, and polyethylenes and polypropylenes are particularly preferable among these.

For the hydrophobic thermoplastic resin composition, a light stabilizer is preferably added. The content of light stabilizer in the hydrophobic thermoplastic resin is typically from about 0.2% by weight, or about 0.3% by weight, or about 0.5% by weight, to about 10% by weight, or to about 8% by weight, or to about 5% by weight, based on the total weight of the hydrophobic thermoplastic resin composition.

When the content is less than these ranges, the hydrophobic thermoplastic resin composition tends to be degraded by ultraviolet light. When the content is greater than these ranges, the hydrophobic thermoplastic resin composition has poor mechanical strength.

Regarding the melt viscosity of the hydrophobic thermoplastic resin composition, the MFR at 190° C. and a 2160 g load typically has a lower limit of about 0.1 g/10 minutes, or about 0.2 g/10 minutes, and typically has an upper limit of about 100 g/10 minutes, or about 60 g/10 minutes. The difference between the MFR of the hydrophobic thermoplastic resin composition and the MFR of the EVOH resin composition is preferably small. When the melt viscosity of the hydrophobic thermoplastic resin composition is as described above, an excellent multilayer article without layer unevenness can be obtained.

Alternatively, other functional layers can be incorporated into the multilayer articles, such as the materials provide heat sealability and scuff resistance and toughness.

In some embodiments, the content of the hindered amine compound used in a hydrophobic thermoplastic resin layer described herein is preferably 0.01 to 5 part by mass, more preferably 0.02 to 1 part by mass, based on 100 parts by mass of the hydrophobic thermoplastic resin layer. In some embodiments, a content of the hindered amine compound disclosed herein is from about 1, 0.9, 0.8, 0.7, 0.6, 0.5, 0.4, 0.3, 0.2, or 0.1 mass % to about 5, 4, 3, 2, 1, 0.9, 0.8, 0.7, 0.6, 0.5, 0.4 or 0.3 mass % of the hydrophobic thermoplastic resin layer. When the content of the hindered amine compound is less than 0.01 parts by mass, the hindered amine compound may not have any impact on the hydrophobic thermoplastic resin layer. On the other hand, when the content of the hindered amine-based compound is more than 5 part by mass, the film may be colored.

Mass Ratio of Hydrophobic Thermoplastic Resin and Hindered Amine Compound

In the hydrophobic thermoplastic resin composition according to some embodiments of the present disclosure, a mass ratio of an amount of hydrophobic thermoplastic resin to a total amount of the hydrophobic thermoplastic resin and the hindered amine compound is from about 90, 91, 92, 93, 94, 95, 96, 97, 98, 99, 99.1, 99.2, 99.3, 99.4, 99.5, 99.6, 99.7, 99.8, or 99.9 to about 99.99, 99.9, 99.8, 99.7, 99.6, 99.5, 99.4, 99.3, 99.2, 99.1, 99.0 mass %. In some embodiments, a content of the hindered amine compound disclosed herein is from about 1, 0.9, 0.8, 0.7, 0.6, 0.5, 0.4, 0.3, 0.2, or 0.1 mass % to about 5, 4, 3, 2, 1, 0.9, 0.8, 0.7, 0.6, 0.5, 0.4 or 0.3 mass %.

Multilayer Structure

Examples of the layer structure of the multilayer article is shown below.

E/AD/(T)x

E/AD/E/AD/(T)x

E/AD/E/AD/E/(T)x x=1-9, T may be the same or different.

EVOH may prevent the penetration of fungicides and pesticides by preparing films having a EVOH resin composition layer.

For improving the heat resistance of films in order to avoid film breaking from metal frames, the EVOH resin composition layer is an outer layer contacting the metal frames, and the hydrophobic thermoplastic resin composition layer is used as the outer layer on the other side.

Regarding the thickness of a multilayer film in accordance with one embodiment of the present invention, the total thickness thereof is typically from about 30 μm, or from about 50 μm, or from about 70 μm, to about 1000 μm, or to about 800 μm, or to about 600 μm.

The thickness of each T layer in the article is not particularly limited, but is typically from about 10 μm, or from about 20 μm, or from about 30 μm, tor to about 500 μm, or to about 400 μm, or to about 300 μm.

The thickness of each AD layer in the article is not particularly limited, but is typically from about 3 μm, or from about 4 μm, or from about 5 μm, to about 50 μm, or to about 40 μm, or to about 30 μm.

The thickness of each EVOH resin composition layer in the article is not particularly limited, but is typically from about 3 μm, or from about 4 μm, or from about 5 μm, to about 50 μm, or to about 40 μm, or to about 30 μm.

Preparation of Multilayer Structure

Methods of producing multilayer articles in accordance with the present invention are broadly classified into a process involving melting the EVOH resin composition, adhesive resin and hydrophobic thermoplastic resin, then molding the resultant melt (a melt molding process), for example. The melt molding procedure for obtaining the molded product is not limited, often exemplified by cast extrusion, blown extrusion, and the like. Specific examples thereof include the following: melt extrusion of EVOH resin composition, adhesive resin and hydrophobic thermoplastic resin to form each layer; coextruding all layers, the layers are then disposed in a side-by-side relationship to form a multilayer structure.

A Container Type House System

Above multilayer articles can be used for a container type house system, such as greenhouses. The structure of the house system is not limited. For example, the pillars which are made of metal frames are erected on the bases, the roof beams are passed to the upper ends of these columns, and the upper surface of the roof beams and the outer surfaces of the columns. In addition, the above multilayer articles which are used as greenhouse cover articles are attached to the pillars and roof beams. The container type house system is used for the intensive cultivation under an environment exposed to UV light, fungicides and pesticides.

EXAMPLES

The present invention is more specifically described by way of examples. The scope of the present invention, however, is not limited to these examples.

Materials

EVOH-1: EVAL™ H171B, Kuraray America, Inc., Houston, Tex. USA (Ethylene Content: 38 mol %, Saponification degree 99.9%, MFR=1.7 g/10 min)

AD1: Maleic anhydride modified polyethylene: ADMER™ NF498E, Mitsui Chemicals America. Inc., Rye Brook, New York USA LLDPE-1: Linear low density polyethylene: Sclair® FP120-A, NOVA Chemicals Corporate, Calgary, Alberta Canada Hindered amine compound having a 2,2,6,6-tetraalkylpiperidine ring structure and having an alkoxy group bonded to a nitrogen atom in the ring structure (NOR-HALS): Tinuvin NOR 371, BASF Corporation, Florham Park, N.J. USA Hindered amine compound having a 2,2,6,6-tetraalkylpiperidine ring structure and having no alkoxy group bonded to a nitrogen atom in the ring structure (HALS): Chimassorb 2020, BASF Corporation, NJ USA

Example 1: E1/AD1/T1 Multilayer Film

Preparation of EVOH Resin Composition: E1

99.4 parts by mass of EVOH-1 (EVAL™ H171B), 0.6 parts by mass of NOR-HALS (Tinuvin NOR 371) were blended. The resulting blend was subjected to melt compounding, pelletizing and drying under the following conditions, and then EVOH resin composition E1 was obtained.

Apparatus: 30mmD twin screw extruder (TEX-30a manufactured by The Japan Steel Works, Ltd.)

L/D: 45

Screw: co-rotating full-intermeshing type

Number of die holes: 4 holes (3 mmD)

Extrusion temperature (° C.): C2=180, C3=200, C4-C13=220, Die=220

Screw rotation speed: 250 rpm

Output: about 20 kg/hr

Drying: hot air drying at 80° C. for 6 hr

Preparation of Hydrophobic Resin Composition: T1

99.4 parts by mass of LLDPE-1 (Sclair® FP120-A), 0.6 parts by mass of NOR-HALS (Tinuvin NOR 371) were blended. The resulting blend was subjected to melt compounding, pelletizing and drying under the following conditions, and then hydrophobic resin composition T1 was obtained.

Apparatus: 30mmD twin screw extruder (TEX-30a manufactured by The Japan Steel Works, Ltd.)

L/D: 45

Screw: co-rotating full-intermeshing type

Number of die holes: 4 holes (3 mmD)

Extrusion temperature (° C.): C2=180, C3=200, C4-C13=220, Die=220

Screw rotation speed: 250 rpm

Output: about 20 kg/hr

Drying: hot air drying at 80° C. for 6 hr

Preparation of Multilayer Film

The multilayer film was prepared under the following conditions, followed by trimming into a film.

Conditions for Film Formation

Apparatus: a 7-material-7-layer blown film extruder (Brampton Engineering, Brampton, Ontario Canada)

Extruder

Extruder A: 45-mmφ single screw extruder (L/D=24)

Extruder B: 30-mmφ single screw extruder (L/D=24)

Extruder C: 30-mmφ single screw extruder (L/D=24),

Extruder D: 30-mmφ single screw extruder (L/D=20)

Extruder E: 30-mmφ single screw extruder (L/D=24)

Extruder F: 30-mmφ single screw extruder (L/D=24)

Extruder G: 45-mmφ single screw extruder (L/D=24)

Film structure: A/B/C/D/E/F/G

Die: 150 mm D

Temperature Setting (° C.):

Extruder A: C1/C2/C3/A=193/227/216/221

Extruder B: C1/C2/C3/A=204/210/227/221

Extruder C: C1/C2/C3/A=193/227/216/221

Extruder D: C1/C2/C3/A=193/227/216/221

Extruder E: C1/C2/C3/A=193/227/216/221

Extruder F: C1/C2/C3/A=193/227/216/221

Extruder G: C1/C2/C3/A=193/227/216/221

Die: 221

Material and Thickness Setting

Thickness of each layer were controlled with gravimetric feeders, density of each resins, blow up ratio and draw speed.

Extruder A: LLDPE-1, 40 μm

Extruder B: E1, 10 μm

Extruder C: AD-1, 20 μm

Extruder D: T1, 20 μm

Extruder E: T1, 20 μm

Extruder F: T1, 20 μm

Extruder G: T1, 60 μm

Layer Structure

T1 from extruder D, E, F and G were unified to be one layer. After prepared the films, outer layer (LLDPE-1) was peeled off. Multilayer film having 3-material-3-layer (E1/AD1/T1) was obtained.

Evaluation of the Film

Measuring of Thickness of EVOH Multilayer Film

Samples was collected from the multilayer film. Collected sample was cut by knife and sliced using a microtome (RM2165 manufactured by Leica). Layer thickness was measured using an optical microscope (Model: Eclipse ME600 optical microscope manufactured by Nikon). Film thickness is shown in below and in Table 1.

Total thickness: 150 μm

E1/AD1/T1=10/20/120 μm,

Vapam Treatment in Weather-Ometer (WOM)

In accordance with ASTM G155, the resulting multilayer film was exposed to the metham-sodium (Vapam) vapor solution in Weather-Ometer at 30° C. Inside of the film was exposed to the Vapam. This is a general accelerated test used for evaluating the performance under UV light, fungicides and pesticides.

Time to 50% Elongation with Vapam Treatment in WOM

In accordance with ASTM D 882-18, tensile test of the multilayer film was conducted. The film was subjected to humidity conditioning at 23° C./50% RH. Then, it was cut into a strip having a width of 25.4 mm and a length of 12 cm, and subjected to measurement with universal testing machine (Instron 4466 manufactured by Instron) in machine direction (MD) at grip distance of 50 mm and a tensile speed of 500 mm/minute. The elongation at break was measured before and after the Vapam treatment. The measurement was done for films having different treatment time. The treatment time to make elongation at break of films 50% from films before Vapam treatment was evaluated. Longer time to become 50% elongation from films before treatment means better chemical resistance and longer service life when it applies to films for a container type house system. The results are shown in Table 1.

Heat Resistant Test

Heat resistance of film supposing it attaches to metal frame in greenhouse was evaluated with following method. The multilayer film was cut into 29 cm length and 20 cm width. The film attached on an A4 size metal frame having 2 cm width with a heat resistant tape. E1 layer contacted to the metal frame. The film on the metal frame located in a hot air dryer (Yamato DVS 600) at 80° C. for 1 week assuming temperature of a metal frame of the container type house under strong sunlight. After the test, the film was not stick to the metal frame.

Comparative Example 1: T1 Monolayer Film

T1 was prepared in the same manner with Example 1.

Monolayer film of T1 was prepared in the same manner with preparation of multilayer film in Example 1 except for materials and thickness setting as shown below. T1 from extruder A, B, C D, E, F and G were unified to be one layer.

Material and Thickness Setting

Thickness of each layer were controlled with gravimetric feeders, density of each resins, blow up ratio and draw speed.

Extruder A: T1, 40 μm
Extruder B: T1, 23 μm
Extruder C: T1, 8 μm
Extruder D: T1, 8 μm
Extruder E: T1, 8 μm
Extruder F: T1, 23 μm
Extruder G: T1, 40 μm Film thickness was measured in the same manner with Example 1.

Total film thickness: 150 μm

Vapam treatment was done and Time to 50% elongation with Vapam treatment in WOM was measured in the same manner with Example 1. The results are shown in Table 1.

Heat resistant test was done in the same manner with Example 1. After the test, the film was stick to the metal frame.

Comparative Example 2: E2/AD1/T2 Multilayer Film

EVOH-1 was used as E2 instead of E1 in Example 1. E2 does not contain NOR-HALS (Tinuvin NOR 371).

Hydrophobic resin composition: T2 was prepared in the same manner with Example 1 except that HALS (Chimassorb 2020) was used instead of NOR-HALS (Tinuvin NOR 371) in T1.

Multilayer film having 3-material-3-layer (E2/AD1/T2) was obtained in the same manner with Example 1 except for materials and thickness setting as shown below.

Material and Thickness Setting

Thickness of each layer were controlled with gravimetric feeders, density of each resins, blow up ratio and draw speed.

Extruder A: LLDPE-1, 40 μm
Extruder B: E2, 8 μm
Extruder C: AD-1, 20 μm
Extruder D: T2, 20 μm
Extruder E: T2, 20 μm
Extruder F: T2, 22 μm
Extruder G: T2, 60 μm Film thickness was measured in the same manner with Example 1.

Total film thickness: 150 μm

E2/AD1/T2=8/20/122

Vapam treatment was done and Time to 50% elongation with Vapam treatment in WOM was measured in the same manner with Example 1. The results are shown in Table 1.

Heat resistant test was done in the same manner with Example 1. After the test, the film was not stick to the metal frame.

Comparative Example 3: E3/AD1/T2 Multilayer Film

EVOH resin composition: E3 was prepared in the same manner with Example 1 except that HALS (Chimassorb 2020) was used instead of NOR-HALS (Tinuvin NOR 371) in E1.

Hydrophobic resin composition: T2 was prepared in the same manner with Comparative Example 2.

Multilayer film having 3-material-3-layer (E3/AD1/T2) was obtained in the same manner with Comparative Example 2 except that E3 was used.

Film thickness was measured in the same manner with Example 1.

Total film thickness: 150 μm

E3/AD1/T2=8/20/122 μm,

Vapam treatment was done and Time to 50% elongation with Vapam treatment in WOM was measured in the same manner with Example 1. The results are shown in Table 1.

Heat resistant test was done in the same manner with Example 1. After the test, the film was not stick to the metal frame.

Comparative Example 4: T1/AD1/E1/AD1/T2

EVOH resin composition: E1 was prepared in the same manner with Example 1.

Hydrophobic resin composition: T1 was prepared in the same manner with Example 1. Hydrophobic resin composition: T2 was prepared in the same manner with Comparative Example 2.

Multilayer film having 4-material-5-layer (T1/A1/E1/AD1/T2) was obtained in the same manner with Example 1 except for materials and thickness setting as shown below.

Material and Thickness Setting

Thickness of each layer were controlled with gravimetric feeders, density of each resins, blow up ratio and draw speed.

Extruder A: T1, 40 μm
Extruder B: T1, 23 μm
Extruder C: AD1, 8 μm
Extruder D: E2, 8 μm
Extruder E: AD1, 8 μm
Extruder F: T2, 23 μm
Extruder G: T2, 40 μm Film thickness was measured in the same manner with Example 1.

Total film thickness: 150 μm

T1/A1/E1/AD1/T2=63/8/8/8/63 μm,

Vapam treatment was done and tensile properties after exposure in WOM of Vapam pre-treated films was measured in the same manner with Example 1. The results are shown in Table 1.

Heat resistant test was done in the same manner with Example 1. After the test, the film was stick to the metal frame.

As shown in Table 1, Example 1 showed long time in the time to 50% elongation with Vapam treatment in WOM, which means that the film had a good chemical resistance. Also, Example 1 showed good heat resistance.

On the other hand, Comparative Example 1 which does not contain EVOH resin composition layer showed shorter time in the time to 50% elongation with Vapam treatment in WOM. Also, Comparative Example 1 showed bad heat resistance.

Comparative Example 2 which does not contains the hindered amine compound having a 2,2,6,6-tetraalkylpiperidine ring structure and having a alkoxy group bonded to a nitrogen atom in the ring structure (NOR-HALS) in EVOH and contains the hindered amine compound having a 2,2,6,6-tetraalkylpiperidine ring structure and having no alkoxy group bonded to a nitrogen atom in the ring structure (HALS) in LLDPE showed shorter time in the time to 50% elongation with Vapam treatment in WOM.

Comparative Example 3 which contains the hindered amine compound having a 2,2,6,6-tetraalkylpiperidine ring structure and having no alkoxy group bonded to a nitrogen atom in the ring structure (HALS) in EVOH and LLDPE in Example 1 showed shorter time in the time to 50% elongation with Vapam treatment in WOM.

Comparative Example 4 which does not have E1 layer as innermost layer showed shorter time in the time to 50% elongation with Vapam treatment in WOM, which means that T1 was deteriorated in the test because of no protection with E1. Also, Comparative Example 4 showed bad heat resistance.

These results explained that Example 1 showed both better chemical resistance and heat resistance than Comparative examples, which means that Example 1 is suitable for use of films for a container type house system like greenhouse with long service life.

TABLE 1

| | Structure Left: Inside Right: Outside | Hindered amine compound in EVOH resin composition | Thickness (μm) Total | EVOH | Vapam treatment in WOM Time to 50% elongation (hours) |
|---|---|---|---|---|---|
| Ex 1 | E1/AD1/T1 | Tinuvin NOR 371 | 150 | 10 | 18700 |
| C Ex 1 | T1 | — | 150 | 0 | 11300 |
| C Ex 2 | E2/AD1/T2 | — | 150 | 8 | 10000 |

TABLE 1-continued

| | Structure Left: Inside Right: Outside | Hindered amine compound in EVOH resin composition | Thickness (μm) Total | EVOH | Vapam treatment in WOM Time to 50% elongation (hours) |
|---|---|---|---|---|---|
| C Ex 3 | E3/AD1/T2 | Chimassorb 2020 | 150 | 8 | 7800 |
| C Ex 4 | T1/AD1/E1/AD1/T2 | Tinuvin NOR 371 | 150 | 8 | 8000 |

The invention claimed is:

1. A multilayer article comprising (a) a first layer comprising ethylene-vinyl alcohol copolymer (EVOH) and a first hindered amine compound, wherein the first layer is a first outermost layer having a side that faces inside of a container house system; and (b) a second layer comprising a hydrophobic thermoplastic resin and a second hindered amine compound, wherein the second layer is a second outermost layer on the other side of the first layer, wherein:

the first layer has a thickness of from about 3 μm to about 30 μm, the EVOH has an ethylene content of about 35 mol % or greater and about 40 mol % or less, the EVOH has a degree of saponification of 98 mol % or greater, the EVOH has a melt flow rate of 1 g/10 min to 10 g/10 min, as measured at a temperature of 190° C. and a load of 2160 g in accordance with JIS K 7210, a content of the EVOH in the first layer is at least 98 mass %, a content of the first hindered amine compound in the first layer is 2 mass % or less, the second layer has a thickness of from about 10 μm to about 300 μm, the hydrophobic thermoplastic resin comprises linear low density polyethylene, a content of the hydrophobic thermoplastic resin in the second layer is at least 98 mass %, a content of the second hindered amine compound in the second layer is 2 mass % or less, and the first hindered amine compound and the second hindered amine compound comprise a compound represented by formula (I):

(I)

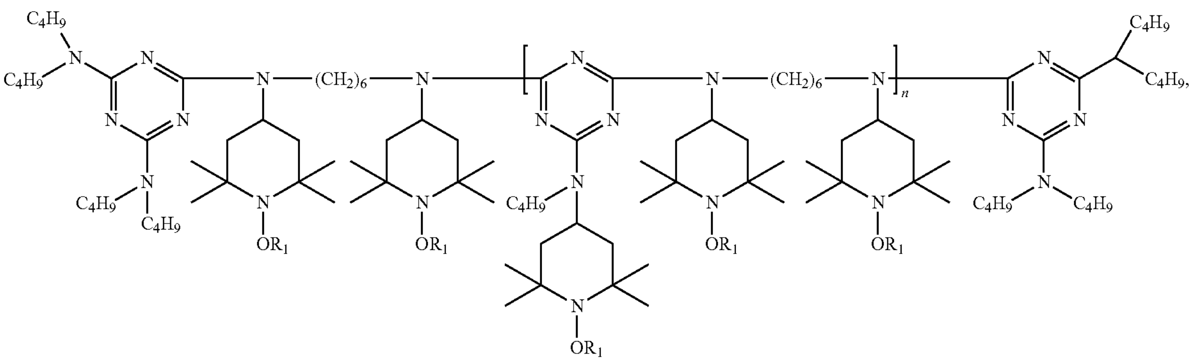

where $R_1$ is $C_3$ alkyl, and n is a number from 1 to 10.

2. The multilayer article according to claim 1, further comprising an adhesive layer between the first layer and the second layer.

3. The multilayer article according to claim 2, wherein the adhesive layer comprises an acid-functionalized polymer resin composition.

4. The multilayer article according to claim 2, wherein the adhesive layer comprises at least one compound selected from the group consisting of polyethylenes modified with maleic anhydride, polypropylenes modified with maleic anhydride, a maleic anhydride-modified ethylene-ethyl acrylate copolymer, and a maleic anhydride-graft-modified ethylene-vinyl acetate copolymer.

5. The multilayer article according to claim 2, wherein the adhesive layer has a thickness of from about 3 μm to about 50 μm.

6. The multilayer article according to claim 2, wherein the content of the EVOH in the first layer is from 98 mass % to 99.99 mass %.

7. The multilayer article according to claim 2, wherein:

the thickness of the first layer is from about 5 μm to about 30 μm, the content of the EVOH in the first layer is at least 99 mass %, the content of the first hindered amine compound in the first layer is 1 mass % or less, the thickness of the second layer is from about 30 μm to about 300 μm, the content of the hydrophobic thermoplastic resin in the second layer is at least 99 mass %, and the content of the second hindered amine compound in the second layer is 1 mass % or less.

8. The multilayer article according to claim 1, wherein the content of the EVOH in the first layer is from 98 mass % to 99.99 mass %.

9. The multilayer article according to claim 1, wherein the first layer further comprises a phosphoric acid compound.

10. The multilayer article according to claim 1, wherein the content of the first hindered amine compound in the first layer is from 0.01 mass % to 2 mass %.

11. The multilayer article according to claim 1, wherein the multilayer article has a total thickness of from about 30 μm to about 1000 μm.

12. The multilayer article according to claim 1, wherein the hydrophobic thermoplastic resin further comprises at least one compound selected from the group consisting of polyolefin resins other than the linear low density polyethylene; polypropylene resins; polybutenes; polypentenes; graft polyolefins obtained by graft modification of these polyolefins with an unsaturated carboxylic acid or an ester thereof; cyclic polyolefin resins; ionomers; an ethylene-vinyl acetate copolymer; an ethylene-acrylic acid copolymer; an ethylene-acrylic acid ester copolymer; a polyester resin; a polyamide resin; polyvinyl chloride; polyvinylidene chloride; acrylic resins; polystyrenes; vinyl ester resins; polyester elastomers; polyurethane elastomers; halogenated polyolefins; and aromatic and aliphatic polyketone.

13. The multilayer article according to claim 1, wherein the content of the hydrophobic thermoplastic resin in the second layer is from 98 mass % to 99.99 mass %.

14. The multilayer article according to claim 1, wherein the content of the second hindered amine compound in the second layer is from 0.01 mass % to 2 mass %.

15. The multilayer article according to claim 1, wherein:

the thickness of the first layer is from about 5 um to about 30 μm, and the content of the first hindered amine compound in the first layer is 1 mass % or less.

16. The multilayer article according to claim 15, wherein:

the EVOH has a degree of saponification of 99 mol % or greater, and the EVOH has a melt flow rate of 1 g/10 min to 3 g/10 min, as measured at a temperature of 190° C. and a load of 2160 g in accordance with JIS K 7210.

17. The multilayer article according to claim 15, wherein:

the ethylene content of the EVOH is about 37 mol % or greater and about 39 mol % or less, and the content of the EVOH in the first layer is at least 99 mass %.

18. The multilayer article according to claim 15, wherein:

the content of the hydrophobic thermoplastic resin in the second layer is at least 99 mass %.

19. The multilayer article according to claim 15, wherein:

the thickness of the second layer is from about 10 μm to about 30 μm, and the content of the second hindered amine compound in the second layer is 1 mass % or less.

20. A container house system used under an environment exposed to UV light, fungicide and/or pesticides, wherein a multilayer article covers a container house, wherein the multilayer article comprises:

(a) a first layer comprising ethylene-vinyl alcohol copolymer (EVOH) and a first hindered amine compound, wherein the first layer is a first outermost layer; and (b) a second layer comprising a hydrophobic thermoplastic resin and a second hindered amine compound, wherein:

the multilayer article is arranged so that the first layer faces inside of the container house system, and the second layer is located outside of the first layer, the second layer is a second outermost layer, the first layer has a thickness of from about 3 μm to about 30 μm, the EVOH has an ethylene content of about 35 mol % or greater and about 40 mol % or less, the EVOH has a degree of saponification of 98 mol % or greater, the EVOH has a melt flow rate of 1 g/10 min to 10 g/10 min, as measured at a temperature of 190° C. and a load of 2160 g in accordance with JIS K 7210, a content of the EVOH in the first layer is at least 98 mass %, a content of the first hindered amine compound in the first layer is 2 mass % or less, the second layer has a thickness of from about 10 μm to about 300 μm, the hydrophobic thermoplastic resin comprises linear low density polyethylene, a content of the hydrophobic thermoplastic resin in the second layer is at least 98 mass %, a content of the second hindered amine compound in the second layer is 2 mass % or less, and the first hindered amine compound and the second hindered amine compound comprise a compound represented by formula (I):

(I)
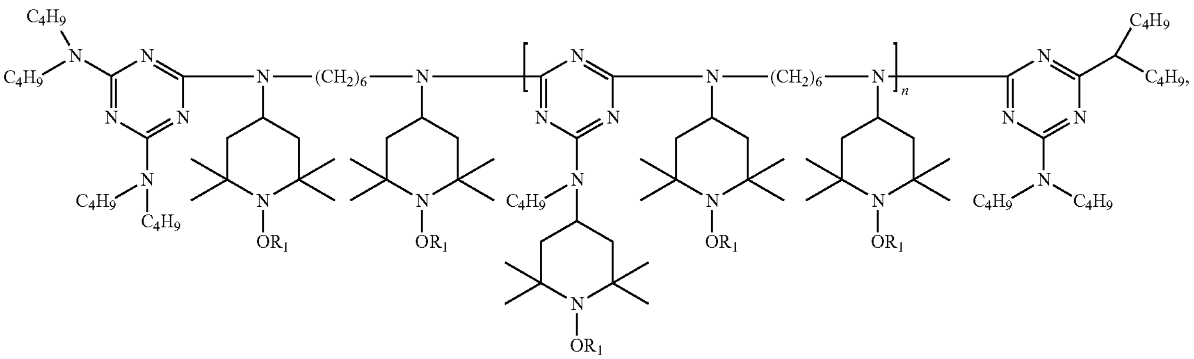
where $R_1$ is $C_3$ alkyl, and n is a number from 1 to 10.
* * * * *